US010027392B2

(12) United States Patent
Lee et al.

(10) Patent No.: US 10,027,392 B2
(45) Date of Patent: Jul. 17, 2018

(54) METHOD AND APPARATUS FOR BLIND DETECTING A TRANSMISSION MODE FOR INTERFERENCE CANCELLATION

(71) Applicants: Heun-Chul Lee, Gyeonggi-do (KR); Sung-Soo Kim, Seoul (KR); Jong-Han Lim, Gyeonggi-do (KR); Sung-Yoon Cho, Seoul (KR)

(72) Inventors: Heun-Chul Lee, Gyeonggi-do (KR); Sung-Soo Kim, Seoul (KR); Jong-Han Lim, Gyeonggi-do (KR); Sung-Yoon Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 240 days.

(21) Appl. No.: 15/005,657

(22) Filed: Jan. 25, 2016

(65) Prior Publication Data

US 2016/0219599 A1    Jul. 28, 2016

Related U.S. Application Data

(60) Provisional application No. 62/106,879, filed on Jan. 23, 2015.

(30) Foreign Application Priority Data

Sep. 24, 2015  (KR) .......................... 10-2015-0135831

(51) Int. Cl.
*H04B 7/0456*  (2017.01)
*H04J 11/00*  (2006.01)

(52) U.S. Cl.
CPC ......... *H04B 7/0486* (2013.01); *H04B 7/0456* (2013.01); *H04J 11/00* (2013.01)

(58) Field of Classification Search
CPC ........................... H04B 7/0486; H04W 72/082
See application file for complete search history.

(56) References Cited

U.S. PATENT DOCUMENTS

| 8,411,780 | B2 * | 4/2013 | Jonsson | H04B 7/0413 375/267 |
|---|---|---|---|---|
| 9,320,046 | B2 * | 4/2016 | Kim | H04W 72/082 |
| 2005/0013348 | A1 * | 1/2005 | Visoz | H04B 1/712 375/148 |
| 2005/0232156 | A1 * | 10/2005 | Kim | H04L 1/0029 370/236 |
| 2008/0247475 | A1 * | 10/2008 | Kim | H04B 7/0417 375/260 |

(Continued)

*Primary Examiner* — Parth Patel
(74) *Attorney, Agent, or Firm* — The Farrell Law Firm, P.C.

(57) ABSTRACT

Methods and apparatuses are provided for determining an interference transmission mode (TM) at a communication device in a cellular communication system using a resource element (RE) defined by frequency and time. A first signal is received in one RE. The first signal comprises a serving signal and an interference signal. A first vector of the received first signal is projected onto each of N projection vectors. A traffic-to-pilot ratio (TPR) decision metric of the interference signal is determined by using N pairs of an actual squared value and an expected squared value which are corresponding to the projected first vector. A TM of the interference signal is detected by determining a TF of the interference signal which minimizes the TPR decision metric from among predetermined transmit format (TF) candidates.

16 Claims, 4 Drawing Sheets

(56) References Cited

U.S. PATENT DOCUMENTS

| | | | | |
|---|---|---|---|---|
| 2008/0293424 A1* | 11/2008 | Cho | H04L 1/1854 | 455/450 |
| 2010/0278290 A1* | 11/2010 | Huang | H04B 7/0434 | 375/346 |
| 2011/0019755 A1* | 1/2011 | Lee | H04B 7/024 | 375/260 |
| 2011/0141933 A1* | 6/2011 | Kim | H04W 52/146 | 370/252 |
| 2012/0033571 A1* | 2/2012 | Shimezawa | H04B 7/026 | 370/252 |
| 2012/0214504 A1* | 8/2012 | Zha | H04W 24/08 | 455/456.1 |
| 2014/0029456 A1* | 1/2014 | Mallik | H04J 11/0023 | 370/252 |
| 2014/0126437 A1* | 5/2014 | Patil | H04B 7/0486 | 370/310 |
| 2014/0192736 A1* | 7/2014 | Jeong | H04L 5/0035 | 370/329 |
| 2015/0003359 A1* | 1/2015 | Hoshino | H04W 24/08 | 370/329 |
| 2015/0017940 A1* | 1/2015 | Soriaga | H04B 7/0802 | 455/278.1 |
| 2015/0117351 A1* | 4/2015 | Nagata | H04J 1/00 | 370/329 |
| 2015/0229452 A1* | 8/2015 | Nagata | H04L 5/0051 | 370/252 |
| 2015/0270917 A1* | 9/2015 | Roman | H04J 11/005 | 370/329 |
| 2015/0327095 A1* | 11/2015 | Kwak | H04B 7/0621 | 370/252 |
| 2015/0341942 A1* | 11/2015 | Lee | H04B 7/0626 | 370/252 |
| 2015/0358101 A1* | 12/2015 | Wachsmann | H04J 11/0036 | 370/329 |
| 2016/0065258 A1* | 3/2016 | Lee | H04W 76/046 | 375/346 |
| 2016/0219599 A1* | 7/2016 | Lee | H04B 7/0486 | |
| 2017/0012750 A1* | 1/2017 | Chen | H04L 5/0032 | |

\* cited by examiner

METHOD AND APPARATUS FOR BLIND DETECTING A TRANSMISSION MODE FOR INTERFERENCE CANCELLATION

PRIORITY

This application priority under 35 U.S.C. § 119(e) to U.S. Provisional Patent Application No. 62/106,879, filed in the U.S. Patent and Trademark Office on Jan. 23, 2015, and under 35 U.S.C. § 119(a) to Korean Patent Application No. 10-2015-0135831, filed in the Korean Intellectual Property Office on Sep. 24, 2015, the entire disclosures of which are incorporated herein by reference.

BACKGROUND

1. Field of the Disclosure

Various embodiments of the present disclosure relate generally to interference cancellation for a communication device in a cellular communication system, and more particularly, to a scheme for blind detecting a transmission mode of an interference signal.

2. Description of the Related Art

To satisfy strict requirements of the international telecommunication union radio communication Sector (ITU-R), next-generation cellular networks, such as, for example, long term evolution-advanced (LTE-A), have been designed that support a broad bandwidth having a maximum of 100 MHz for up to 8 layers in a downlink (DL) and up to 4 layers in an uplink (UL), through higher-order spatial multiplexing and carrier aggregation (CA).

However, spatial frequency reuse using more cells provides a capacity gain that is greater than a case with one cell having an increased spatial order or spectrum bandwidth. Hence, heterogeneous networks using small cells in a macro-cell environment have emerged as a development path for the next-generation cellular networks.

Although heterogeneous networks offer various benefits, they may also bring about an unprecedented challenge to cellular networks. Interference management, which is a matter of great concern (like the number of base stations (BSs)) is significantly increased. In this context, advanced co-channel interference aware signal detection has attracted attention in a recent development process for the LTE-A systems. When cells are deployed very densely in heterogeneous networks, inter-cell interference becomes worse, causing significant issues in cellular networks.

Various attempts have been made to solve the above-described problems.

Enhanced inter-cell interference coordination (eICIC) has been proposed to mitigate interference of a macro cell with respect to a user equipment (UE) located closer to small cells.

In addition, the concept of an almost blank subframe (ABS) has been introduced as a BS-based interference mitigation scheme. In a subframe indicated as an ABS, by a BS, a macro cell may mitigate interference by avoiding transmission in a DL data channel, such as, for example, a physical downlink shared channel (PDSCH), except for pilot signals (e.g., cell-specific reference signals (CRSs)).

UE-based interference mitigation using recognition of a CRS sequence has also been considered. Further enhanced inter-cell interference coordination (FeICIC) permitting CRS interference cancellation (CRS-IC) by a UE has been established by LTE Release 11 of the $3^{rd}$ generation partnership project (3GPP).

Moreover, network-assisted interference cancellation and suppression (NAICS) has been studied by the 3GPP. A work item, referred to as NAICS, is being standardized and approved in LTE Release 12. It has become apparent from the study that a significant performance gain can be achieved on the assumption that interference parameters are known to a UE through broadcasting or dedicated signaling (e.g., higher-layer signaling like radio resource control (RRC) signaling), or newly defined downlink control information (DCI). However, the success of NAICS based on signaling depends on the use of signaled parameters (e.g., a rank indicator (RI), a precoding matrix indicator (PMI), and a modulation level (MOD)) by interfering BSs, potentially limiting scheduling flexibility for neighboring cells. Moreover, the support of interference parameters is not applied at all times in real systems, because a backhaul capacity between BSs and the capacity of control channels from the BS to the UE are generally limited.

To overcome the cell scheduling limitation and the network signaling overhead, the UE may blindly estimate interference parameters from received signals. Joint blind detection (BD) of an RI, a PMI, and a MOD may utilize a maximum likelihood (ML) estimation including an exhaustive search in all possible combinations of Ms, PMIs, and MODs designated in LTE systems. In LTE-orthogonal frequency division multiple access (LTE-OFDMA) systems, for UEs that are scheduled at the same time, assigned RI, PMI, and MOD may vary from one transmission time interval (TTI) to another TTI in a time domain, and from one resource block (RB) to another RB in a frequency domain. This means that joint BD is required to be performed for each RB in every TTI in LTE DL systems.

However, this assumption also means that the interference parameters may dynamically change from one RB of the frequency domain to another RB in every TTI according to channel conditions, which limits scheduling performance and excessively increases the network signaling load.

Furthermore, a need arises to solve an interference issue for LTE DL normal subframes including traffic signals, as well as pilot signals (e.g., a CRS).

SUMMARY

Accordingly, various aspects of the present disclosure provide a method for canceling interference of a communication device in a cellular communication system.

Various aspects of the present disclosure also provide interference cancellation techniques based on a blindly-detected network-assisted interference cancellation and suppression (NAICS) interference parameters.

Various aspects of the present disclosure also provide blind detection methods which estimate a traffic-to-pilot ratio (TPR) to be used by an interfering base station (BS) to address an interference issue related to LTE DL subframes including traffic signals.

Various aspects of the present disclosure also provide a detection method having little loss of a block error rate (BLER) in comparison to a case with an actual TPR, while achieving a low complexity in interference TPR estimation.

Moreover, various aspects of the present disclosure provide a method which estimates a TPR by jointly classifying interference transmission modes for which information may be obtained through projections of a received signal as a set of Grassmannian vectors.

In addition, various aspects of the present disclosure provide a scheme for implementing a blind estimator which detects presence of interfering PDSCHs in a given RB pair.

Furthermore, various aspects of the present disclosure provide a low-complexity scheme for blind detecting an interference transmission mode (TM) in an efficient manner for TMs which deliver a signal through two consecutive subcarriers (or resource elements (REs)).

According to an aspect of the present disclosure, a method is provided for determining an interference transmission mode (TM) at a communication device in a cellular communication system using a resource element (RE) defined by frequency and time. A first signal is received in one RE. The first signal comprising a serving signal and an interference signal. A first vector of the received first signal is projected onto each of N projection vectors. A traffic-to-pilot ratio (TPR) decision metric of the interference signal is determined by using N pairs of an actual squared value and an expected squared value which are corresponding to the projected first vector. A TM of the interference signal is detected by determining a TF of the interference signal which minimizes the TPR decision metric, from among predetermined transmit format (TF) candidates.

According to an aspect of the present disclosure, a method is provided for determining an interference transmission mode (TM) at a communication device in a cellular communication system using a resource element (RE) defined by frequency and time. A first signal is received in two REs corresponding to consecutive subcarriers. The first signal includes a serving signal and an interference signal. A first vector of the first signal is projected onto each of M projection vectors. A TM decision metric is determined using M pairs of an actual squared value and an expected squared value which are corresponding to the projected first vector. A TM of the interference signal is detected which minimizes the TM decision metric, from among predetermined TM candidates. The predetermined TM candidates include a first TM using a transmit diversity scheme and a second TM with a RI=2 using a multiple input multiple output (MIMO) scheme.

According to another aspect of the present disclosure, a communication device is provided in a cellular communication system using a resource element (RE) defined by frequency and time. The communication device includes a transceiver configured to receive a first signal in one RE. The first signal comprises a serving signal and an interference signal. The communication device also includes a controller configured to project a first vector of the received first signal onto each of N projection vectors, determine a traffic-to-pilot ratio (TPR) decision metric of the interference signal using N pairs of an actual squared value and an expected squared value which are corresponding to the projected first vector, and detect a TM of the interference signal by determining a TF of the interference signal which minimizes the TPR decision metric from among predetermined transmit format (TF) candidates.

According to another aspect of the present disclosure, a communication device is provided in a cellular communication system using an RE defined by frequency and time. The communication device includes a transceiver configured to receive a first signal in two REs corresponding to consecutive subcarriers. The first signal includes a serving signal and an interference signal. The communication device also includes a controller configured to project a first vector of the first signal onto each of M projection vectors, determine a TM decision metric using M pairs of an actual squared value and an expected squared value which are corresponding to the projected first vector, and detect a TM of the interference signal which minimizes the TM decision metric from among predetermined TM candidates. The predetermined TM candidates include a first TM using a transmit diversity scheme and a second TM with a RI=2 using a MIMO scheme.

According to another aspect of the present disclosure, a modem chip using an RE defined by frequency and time is provided. The modem chip includes a transceiver configured to receive a first signal in one RE. The first signal includes a serving signal and an interference signal. The modem chip also includes a controller configured to project a first vector of the first signal onto each of N projection vectors, determine a traffic-to-pilot ratio (TPR) decision metric of the interference signal using N pairs of an actual squared value and an expected squared value which are corresponding to the projected first vector, and detect a TM of the interference signal by determining a TF of the interference signal which minimizes the TPR decision metric from among predetermined transmit format (TF) candidates.

According to another aspect of the present disclosure, a method is provided for determining a TM at a communication device in a communication system. A signal is received at the communication device. The communication device projects a vector of the signal onto a set of projection vectors to generate a random variable. The communication device determines a TM decision metric using the random variable. The communication device selects the TM that minimizes the TM decision metric, from a plurality of TMs.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
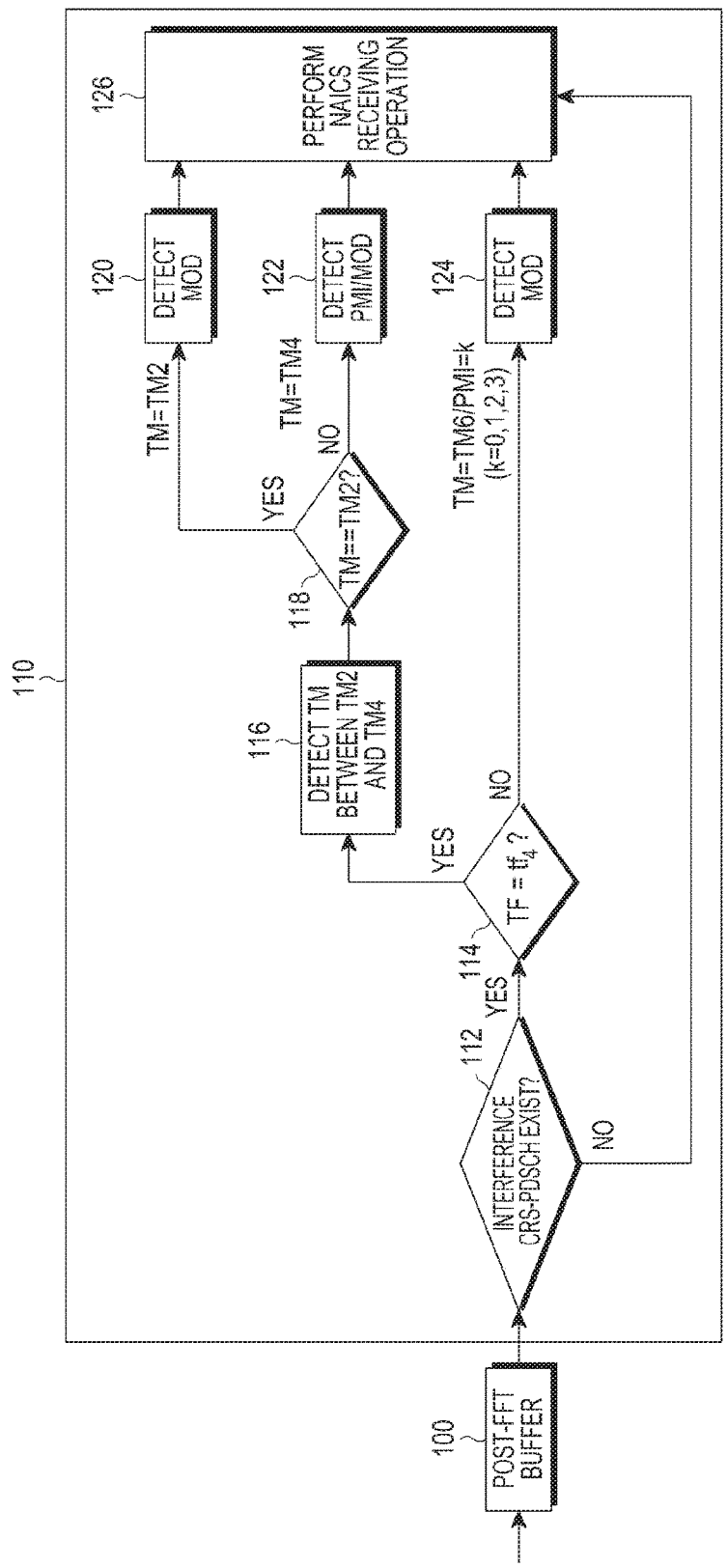
FIG. 1 is a diagram illustrating a method for determining a TM, a MOD, and a PMI of an interference signal by a communication device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Terminology used herein is defined considering functions in the present disclosure and may vary according to a user's or operator's intention or usual practice. Thus, the meanings of the terminology should be interpreted based on the overall context used herein.

Meanings of several terms used herein are provided below. However, it should be noted that the terms are not limited to these interpretation examples.

A BS is an entity for communicating with a UE and may be referred to as node B (NB), eNode (eNB), access point (AP), or the like.

A UE is an entity for communicating with the BS and may be referred to as mobile station (MS), mobile equipment (ME), device, terminal, or the like.

A communication device is a sort of chip (or chipset) included in a UE, and may be a device such as a modem chip. The communication device may include a processor and at least one component such as, for example, a control module or a transmission and reception module.

A method for detecting a traffic-to-pilot ratio, (TPR) disclosed herein provides information regarding an interference TM in light of a transmit format (TF). A low-complexity detection algorithm is provided to blindly estimate an interference TM, a PMI, and a MOD by using a provided TF.

Table 1 shows examples of candidate sets of TMs, PMIs, and MODs specified for a MIMO LTE system using two transmit antennas.

TABLE 1

| TM  | RI(l) | PMI(p) | MOD(q) |
|-----|-------|--------|--------|
| 2   | 2     | $\frac{1}{\sqrt{2}}\begin{bmatrix} 1 & 0 \\ 0 & 1 \end{bmatrix}$ | {4,4}, {16,16} |
| 3   | 2     | $\frac{1}{2}\begin{bmatrix} 1 & 1 \\ 1 & -1 \end{bmatrix}, \frac{1}{2}\begin{bmatrix} 1 & 1 \\ -1 & 1 \end{bmatrix}$ | {4,4}, {16,16} |
| 4   | 2     | $\frac{1}{2}\begin{bmatrix} 1 & 1 \\ 1 & -1 \end{bmatrix}, \frac{1}{2}\begin{bmatrix} 1 & 1 \\ j & -j \end{bmatrix}$ | {4,4}, {4,16} {16,4}, {16,16} |
| 4/6 | 1     | $\frac{1}{\sqrt{2}}\begin{bmatrix} 1 \\ \exp\left(j\frac{k\pi}{2}\right) \end{bmatrix}, k=0,1,2,3$ | 4, 16 |

Here, RI, PMI, and MOD are denoted by l, p, and q, respectively. For convenience, quadrature amplitude modulation (4QAM) and 16QAM are provided as examples of MOD. In NAICS, according to an embodiment the present disclosure, it is assumed that an RI of TM2, which indicates the number of transmission layers, is set to 2 for blind detection, and TM2 transmits a single codeword through two transmission layers.

To obtain unknown interference modulation for a constellation set, $p_q$ denotes a prior probability of each modulation level q ($q \in \{4, \ldots, 16\}$) for a given MOD q, and $p_q^j$ denotes a prior probability of each constellation point $c_q^j \in \{1, \ldots, q\}$).

An NAICS maximum likelihood (ML) receiver performs symbol-level interference cancellation without priori information regarding an interference TM (a TM of an interference signal), an interference PMI (a PMI of the interference signal), and an interference MOD (an MOD of the interference signal). Thus, sets of TMs, PMIs, and MODs are assumed to be equally probable. The same assumption may be applied to a constellation point. Thus, $p_q = \frac{1}{2}$ and $p_q^j = \frac{1}{2}$. Accordingly, it is well known that blind detection based on ML estimation minimizes an error probability.

To reduce computational complexity, an embodiment of the present disclosure provides sequential detection of a TPR, a TM, and a PMI/MOD (that is, detection of the TPR and the TM, followed by detection of the PMI and/or the MOD for the detected TPR and TM).

TPR detection disclosed herein provides information referred to as a TF through which a communication device may determine whether an interference TM is TM6 or not. If the interference TM is TM6, the communication device may also determine a PMI. Thus, embodiments of the present disclosure use projection-based TPR and TM detection while applying Euclidean distance (ED)-based PMI and MOD detection. Herein, the TF is information indicating a combination of a TM and a PMI, and the communication device may recognize a TM value (or a range thereof) and a PMI value (or a range thereof) through the TF. Specifically, the TF is information indicating a group generated by combinations of TMs and PMIs, and may have values as shown in Table 2.

TABLE 2

| TF | TM | PMI |
|----|----|----|
| First TF ($tf_0$) | TM 6 (or Rank-1 TM 4) | 0 |
| Second TF ($tf_1$) | TM 6 | 1 |
| Third TF ($tf_2$) | TM 6 | 2 |
| Fourth TF ($tf_3$) | TM 6 | 3 |
| Fifth TF ($tf_4$) | TM 2/TM 3 | N/A |
|  | Rank-2 TM 4 | 1, 2 |

For projection-based detection, a communication device, according to embodiments of the present disclosure, may use a channel-independent projection vector set or a channel-dependent projection vector set. Specifically, the communication device, according to embodiments of the present disclosure, may apply the same set of predetermined vectors regardless of channel realizations or channel-independent vectors computed for given channel realizations. Thus, embodiments of the present disclosure focus on a channel-dependent set of Grassmannian vectors, which saves computation costs in HW implementation. Embodiments of the present disclosure may further simplify PMI and MOD detection to avoid ED calculation. Since a PMI value of Rank-1 (RI=1) TM4 is determined, as shown in Table 2, Rank-1 TM4 may be handled in a manner similar to that of TM6 in an NAICS operation. Unless described otherwise, embodiments of the present disclosure express Rank-2 (RI=2) TM4 as TM4.

FIG. 1 is a diagram illustrating a method for determining a TM, a MOD, and a PMI of an interference signal by a communication device, according to an embodiment the present disclosure.

The communication device receives a radio signal, performs fast Fourier transform (FFT) on the received radio signal, and stores the FFT signal in a buffer, in step 100. An operation performed by the communication device prior to the FFT follows a general RF processing procedure.

The communication device determines a TM and other parameters of an interference signal by using the FFT signal, and performs at least one of the operations provided in block 110 for interference cancellation.

More specifically, the communication device determines a TPR and a TF of an interference signal to determine whether the interference signal exists, in step 112. For example, the communication device determines whether an interfering CRS-PDSCH exists by using a signal received in each RE.

If it is determined that the CRS-PDSCH does not exist, the communication device determines that there is no interference, and performs a subsequent NAICS operation, in step 126.

If it is determined that the CRS-PDSCH exists, the communication device determines a TM and other interference parameters of the interference signal.

More specifically, the communication device determines whether a TF of the interference signal is $tf_4$ (TM2, TM3, TM4), in step 114, which may be performed using a signal received in each RE and will be described in greater detail below with reference to FIG. 2.

If the TF is not $tf_4$, the communication device determines the TM of the interference signal, in step 124. In this case, the communication device determines that the TM of the interference signal is TM6 and determines the PMI based on i (i=0, 1, 2, 3) of $tf_i$ indicated by the determined TF. The communication device performs an operation of detecting a desired signal while canceling the interference signal by using the PMI and the MOD (that is, an NAICS receiving operation), in step 126.

If the TF is $tf_4$, the communication device determines (that is, detects) the TM of the interference signal between TM2 and TM4, in step 116. The operation of detecting the TM of the interference signal may be performed using a signal received through two adjacent (consecutive) REs, and is described in greater detail with reference to FIGS. 3 and 4.

The communication device determines whether the TM of the interference signal is TM2, in step 118.

If the TM of the interference signal is TM2, the PMI is predetermined (for example, as shown in Table 1), such that the communication device performs detection of the MOD, in step 120. The communication device detects an NAICS symbol by using the detected MOD, in step 126.

If the TM of the interference signal is not TM2, the communication device determines that the TM of the interference signal is TM4 with an RI of 2 and detects the PMI an the MOD, in step 122 (this is because TM3 is not different from TM4 in performance of blind detection and MIMO demodulation, and thus, is handled as TM4). The communication device performs the NAICS receiving operation by using the detected PMI and MOD, in step 126.

Hereinafter, a scheme for blind detecting a TPR and a TF is described, according to an embodiment the present disclosure. TPR and TF detection may be performed using a signal received in each RE.

Embodiments of the present disclosure provide a blind detection method for estimating an interference TPR based on received signal observations on REs, which are used for data transmission in both serving and interfering cells.

An $l_i$-dimensional complex signal vector transmitted from a base station (BS) i at a $k^{th}$ RE is denoted as $x_k^i = [x_k^{i,1}, \ldots, x_k^{i,l_i}]^T$, where $x_k^{i,1}$ denotes an lth spatial layer, $l_i$ denotes the number of transmission layers (that is, an RI), and $[\cdot]^T$ denotes a transpose of a vector.

The symbol $x_k^{i,1}$ is selected from a constellation set $C^{i,1}$ having a cardinality denoted by $|C^{i,1}|$.

An average transmit power of $x_k^{i,1}$ is given by $E[|x_k^{i,1}|^2] = \sigma_i^2$. Herein, $E[\cdot]$ denotes an expectation operator, and $|\cdot|$ denotes an absolute value of a complex number. Without loss of generality, embodiments of the present disclosure indicate a BS with i=S as a serving BS and a BS with i=I as an interfering BS.

A signal vector received by a desired UE through an RE k is $r_k$, and $r_k$ may be expressed as Equation (1) below:

$$r_k = H_k^S x_k^S + H_k^I x_k^I + n_k \quad (1),$$

where $H_k^I$ denotes an effective channel matrix including an actual channel matrix and a precoding matrix, and $n_k$ denotes an additive noise vector having independent and identically distributed (i.i.d) complex Gaussian elements with a variance of $\sigma_n^2$. k has a value between 1 and K, and the communication device is assumed to perform blind detection using a total of K REs.

In LTE systems, a pilot signal, such as, for example, a cell-specific reference signal (CRS), is used for a UE to estimate a channel from a BS. Estimated channel matrices for a serving BS and an interfering BS are $G_{crs,k}^S$ and $G_{crs,k}^I$ respectively, and a signal vector received in an $k^{th}$ data RE may be expressed as Equation (2) below:

$$r_k = \sqrt{\rho_S} G_{crs,k}^S P_k^S x_k^S + \sqrt{\rho_I} G_{crs,k}^I P_k^I x_k^I + n_k \quad (2),$$

where $\rho_i$ (i=S or I) denotes a ratio of a data RE transmit power (i.e., a traffic transmit power) to a CRS RE transmit power (i.e., a pilot transmit power), that is, a TPR.

The TPR $\rho_i$ is given by a function of two TPR parameters (denoted by PA and PB) specified in 3GPP LTE systems, depending on data RE positions with respect to an OFDM index within each TTI. While the exact value of the static cell-specific parameter PB is available at the UE by RRC signaling, the dynamic UE-specific parameter PA is required to be detected from signaled candidate values.

By denoting a Frobenius norm of a matrix (or a vector) as $\|\cdot\|_f$, an expectation value of a received signal power may be expressed as Equation (3) below:

$$E[\|r_k\|^2] = \rho_S \sigma_S^2 \|G_{crs,k}^S P_k^S\|_f^2 + \rho_I \sigma_I^2 \|G_{crs,k}^I P_k^I\|_f^2 + N_r \sigma_n^2 \quad (3),$$

which shows that the expectation value of the received signal power is a function of an interference precoding matrix (or vector) $P_k^I$.

$\rho_S$ and $P_k^S$ are provided to the UE by network signaling, but $\rho_I$ and $P_k^I$ are not provided. As shown in Equation (3), blind detection of $\rho_I$ based on a received signal power requires knowledge of $P_k^I$.

Embodiments of the present disclosure provide a scheme for estimating $\rho_I$ by classifying a TM of an interference signal into a TF. Embodiments of the present disclosure classify TMs into TFs according to a norm of a resulting composite channel matrix, and use computational results for the respective classified TFs.

All CRS-based TMs specified for LTE systems may be divided into five TFs, as shown in Table 2, according to a squared norm value of a corresponding composite channel matrix (i.e., $\|G_{crs,k}^I P_k^I\|_f^2$ of Equation (3)). That is, the TFs may include a first TF $tf_0$ (TM6 with PMI=0), a second TF $tf_1$ (TM6 with PMI=1), a third TF $tf_2$ (TM6 with PMI=2), a fourth TF $tf_3$ (TM6 with PMI=3), and a fifth TF $tf_4$ (TM2, TM3, rank-2 TM4). Embodiments of the present disclosure use, for estimation of $\rho_I$, the fact that different TFs have different squared norm values.

The TMs belonging to the fifth TF $tf_4$ (i.e., TM2, TM3, and TM4) have the same squared norm as $\|G_{crs,k}^I P_k^I\|_f^2 = \frac{1}{2} \|G_{crs,k}^I\|_f^2$ regardless of $P_k^I$ because the precoding matrix $P_k^I$ is a unitary matrix scaled by $\sqrt{2}$ to fit a power constraint.

In comparison, for the remaining TFs {tf0, tf1, tf2, tf3}, the squared norm of $\|G_{crs,k}^I P_k^I\|_f^2$ remains a function of $P_k^I$, where $\|G_{crs,k}^I P_k^I\|_f^2$ is determined by an angle between two sub-spaces spanned by row vectors of $G_{crs,k}^I$ and $P_k^I$ in an $N_r$-dimensional complex vector space $\mathbb{C}^{N_r}$, and the angle is also known as a beamforming gain.

Once the TM determined by $P_k^I$ is known at the UE, the $\rho_I$ detection problem is solvable. For example, the $\rho_I$ detection problem may be solved by using a maximum ratio combining (MRC) vector with respect to a resulting channel matrix $G_{crs,k}{}^I P_k{}^I$ which is optimal to maximize a ratio of a desired signal power with respect to a residual signal-to-noise-plus-power.

Unfortunately, the foregoing presumption (that the TM determined by $P_k{}^I$ is known at the UE) is not applied. Thus, embodiments of the present disclosure provide a scheme for estimating $\rho_I$ jointly with TM (tf$_i$, i=0, . . . , 4). The remaining problem is how to identify which TF the interference TM belongs to. The present disclosure may perform TF classification by projecting a received signal vector onto a set of M projection vectors, $p_m$ (m=1, . . . , M), where M indicates the size of the set $p_m$, and m indicates an index of a projection vector.

Figure 2:
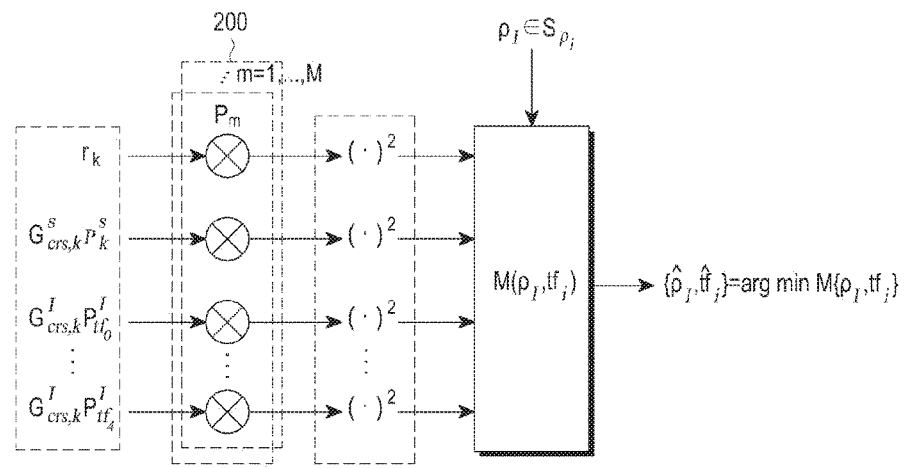
FIG. 2 is a block diagram illustrating blind detection of a TPR and a TF of a projection-based interference signal using each RE, according to an embodiment of the present disclosure.

FIG. 2 is a block diagram illustrating blind detection of a TPR and a TF of a projection-based interference signal using each RE, according to an embodiment of the present disclosure.

Information about a composite channel matrix $G_{crs,k}{}^I P_k{}^I$ may be obtained by projecting the received signal vector onto a set 200 of M projection vectors. Projection of the received signal vector $r_k$ onto $p_m$ may be expressed using $p_{m,k}$ as Equation (4) below:

$$p_{m,k} = (p_m)^\dagger r_k = \sqrt{\rho_S}(p_m)^\dagger G_{crs,k}{}^S P_k{}^S x_k{}^S + \sqrt{\rho_I}(p_m)^\dagger G_{crs,k}{}^I P_k{}^I x_k{}^I + (p_m)^\dagger n_k \quad (4),$$

where $(\ )^\dagger$ denotes an Hermitian operation and may be expressed as application of a conjugate operation and a transpose operation to a vector (or a matrix). In an i.i.d MIMO Rayleigh fading scenario, a line generated by column vectors of a resulting composite channel matrix $G_{crs,k}{}^I P_k{}^I$ may be assumed to be an isotropic line passing through an origin in an $N_r$-dimensional complex vector space $\mathbb{C}^{N_r}$.

Embodiments of the present disclosure provide using a set of Grassmannian vectors as the projection vector pm. For example, Table 3 includes a set of unit-norm Grassmannian vectors for M=4 and a vector size $N_r$=2 for TPR detection.

TABLE 3

| M | Set of Grassmannian Vectors |
|---|---|
| 4 | $\begin{bmatrix} -0.1612 - j0.7348 \\ -0.5135 - j0.4128 \end{bmatrix}$, $\begin{bmatrix} -0.0787 - j0.3192 \\ -0.2506 + j0.9106 \end{bmatrix}$, $\begin{bmatrix} -0.2399 + j0.5985 \\ -0.7641 - j0.0212 \end{bmatrix}$, $\begin{bmatrix} -0.9541 \\ 0.2996 \end{bmatrix}$ |

Under the assumption that elements $x_k{}^S$ and $x_k{}^I$ are independent and Gaussian distributed with zero mean and variance, respectively, with $\sigma_S{}^2$ and $\sigma_I{}^2$, and are given channel realizations and precoding matrices, the random variable $p_{m,k}$ has a Gaussian distribution with a zero mean (i.e., $E[p_{m,k}]=0$) and a variance expressed by Equation (5) below.

$$VAR[p_{m,k}] = \rho_S \sigma_S{}^2 \|(p_m)^\dagger G_{crs,k}{}^S P_k{}^S\|_f^2 + \rho_I \sigma_I{}^2 \|(p_m)^\dagger G_{crs,k}{}^I P_k{}^I\|_f^2 + \sigma_n{}^2 \|p_m\|_f^2 \quad (5)$$

It is known that a sum of squares of K independent Gaussian variables ($x_k{}^S$ and $x_k{}^I$) with zero means and unit variances is a chi-square random variable with K degrees of freedom. If a sum of squares of random variables, $\chi_m$, expressed as Equation (4) is defined as Equation (6) below, $\chi_m$ follows chi-square distribution having K degrees of freedom.

$$\chi_m = \sum_{k=1}^{K} \frac{|p_{m,k}|^2}{VAR[p_{m,k}]} \quad (6)$$

One of the basic properties of the chi-square distribution is that its mean is equal to the degrees of freedom and its variance is equal to two times the degrees of freedom. Therefore, the mean of the chi-square distribution may be expressed as Equation (7) below, and the variance of the chi-square distribution may be expressed as Equation (8) below:

$$E[\chi_m] = K, \quad (7)$$

$$VAR[\chi_m] = 2K \quad (8)$$

As the degree of freedom K increases (i.e., the number of REs used for blind detection increases), the chi-square distribution tends to follow a Gaussian distribution. Thus, the distribution of $\chi_m$ may be asymptotically approximated as Equation (9) below:

$$\frac{1}{\sqrt{2\pi \times 2K}} \exp\left(-\frac{(\chi_m - K)^2}{2 \times 2K}\right). \quad (9)$$

As can be seen from Equations (4) and (5), the present disclosure explicitly considers $P_k{}^I$, which in turn determines a TF (i.e., tf$_i$). A probability P of an interference TPR being $\rho_I$ for a TF of tf$_i$, i.e., ($\rho_I$, tf$_i$), may be obtained by considering a total of M projections as set forth in Equation (10) below:

$$P(\rho_I, tf_i) = \prod_{m=1}^{M} \frac{1}{\sqrt{2\pi \times 2K}} \exp\left(-\frac{(\chi_m - K)^2}{2 \times 2K}\right) \quad (10)$$

In order to obtain a low complexity decision metric, by taking a logarithm of Equation (10) and removing constant terms, a TPR decision metric may be defined as Equation (11) below:

$$M(\rho_I, tf_i) = \sum_{m=1}^{M} (\chi_m - K)^2 \quad (11)$$

Equation (11) may be simplified as set forth in Equation (12) below:

$$M(\rho_I, tf_i) \cong \sum_{m=1}^{M} \left( \frac{\sum_{k=1}^{K} |p_{m,k}|^2 - \sum_{k=1}^{K} VAR[p_{m,k}]}{\sum_{k=1}^{K} VAR[p_{m,k}]} \right)^2, \quad (12)$$

where an actual squared value of a projection output with respect to a received signal is expressed as $|p_{m,k}|^2$, and an expected squared value is expressed as a variance $VAR[p_{m,k}]$. The TPR decision metric may be determined by using M pairs of the actual squared value and the expected squared value. Specifically, a communication device, according an embodiment to the present disclosure, may decide the metric by using an actual squared value and an expected squared value of a projection output with respect to a received signal, $P_{m,k}$.

Next, $\hat{\rho}_I$ satisfying Equation (13) may be detected.

$$\{\hat{\rho}_I, \widehat{tf}_I\} = \arg \min_{\rho_I \in S_{\rho_I}, tf_I \in \{0,\ldots,4\}} \mathcal{M}(\rho_I, tf_I) \tag{13}$$

where $S_{\rho_I}$ denotes a set of possible TPRs. As shown in Equation (13), TPR blind detection provides information about an interference TM in view of a TF, and the information about the interference TM may be used in a TM blind detection procedure described below.

As described above, it has been agreed in 3GPP that a specific value of PA and the set of candidate values PB being used in neighboring cells are to be signaled to the UE via signaling (e.g., RRC signaling). This signaling not only improves the performance of TPR detection but also reduces its complexity. For example, a corresponding set of candidate TPRs, denoted by $S_{\rho_I}^{RRC}$ can be obtained as a function of signaled parameters PA and PB and used for $S_{\rho_I}$ of Equation (13) (i.e., $S_{\rho_I}^{RRC} = S_{\rho_I}$).

It should be noted that the TPR blind detection may be performed by a blind estimator, which detects whether any interfering PDSCHs exist or do not exist in a given RB pair.

In particular, the nonexistence of PDSCH can be represented as $\rho_I = 0$. Accordingly, embodiments of the present disclosure may perform TPR blind detection jointly with presence detection of interfering PDSCHs by using a set of candidate TPRs $S_{\rho_I}^{RRC} = \{0 \; S_{\rho_I}\}$.

The basic principle of NAICS relies on exploiting interference information (i.e., TM, PMI, MOD) at the UE. Embodiments of the present disclosure provide a method for blind detecting parameters of the information (i.e., TM, PMI, MOD) under an assumption that the UE does not cancel a serving signal.

In TM blind detection, transmission mode 3 (i.e., TM3) may be treated as a subset of transmission mode 4 (i.e., TM4). This is due to the fact that, referring to Table 1, two precoding matrices specified for TM3

$$\left(\text{i.e., } \frac{1}{2}\begin{bmatrix} 1 & 1 \\ 1 & -1 \end{bmatrix} \text{ and } \frac{1}{2}\begin{bmatrix} 1 & 1 \\ -1 & 1 \end{bmatrix}\right)$$

do not differ from TM4 in performance of blind detection and MIMO demodulation. In the same way, TM4 with l=1 can be considered as TM 6. According to an embodiment of the present disclosure, interference TMs will be detected as one of TM2 with l=2, TM4 with l=2 and TM6 with l=1 for a subsequent MIMO demodulation process.

A method for blind detecting a TM by using two consecutive REs for $TF = tf_4$ is described in detail below.

As shown in Equation (13), the TPR detection provides additional information about an interfering TM, that is, a TF as defined in Table 2. According to the additional information, when the detected TF is one of $tf_0$, $tf_1$, $tf_2$, and $tf_3$, an interfering TM may be estimated (or determined) as TM6 with an index given by a TF as a PMI based on a relationship between TM and TF shown in Table 2.

If $tf_4$ is detected by TPR blind detection, it is necessary to blindly detect TM2 through TM4. Thus, embodiments of the present disclosure make use of the fact that 2-antenna space-frequency block code (SFBC) is applied to consecutive subcarriers (i.e., REs) for TM2. Unlike in TM2, for TM4, a transmit symbol vector over two adjacent subcarriers is independently generated.

Figure 3:
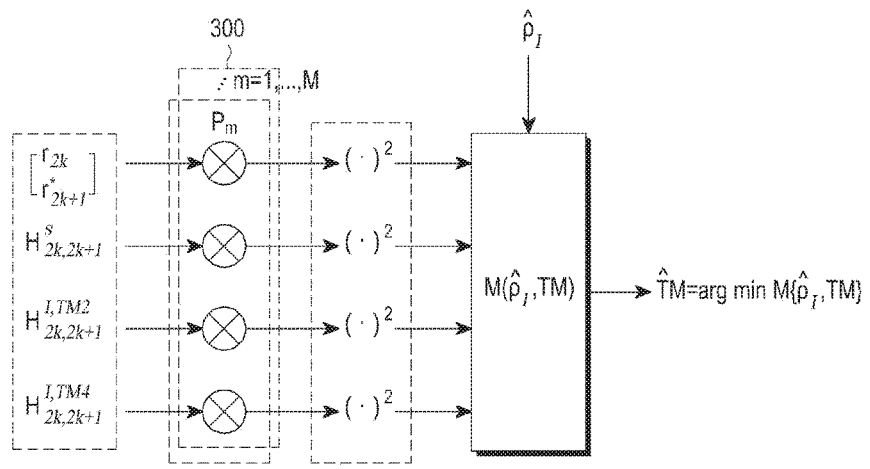
FIG. 3 is a block diagram illustrating blind detection of a TM of a projection-based interference signal using two consecutive REs, according to an embodiment of the present disclosure.

FIG. 3 is a block diagram illustrating blind detection of a TM of a projection-based interference signal using two consecutive REs, according to an embodiment of the present disclosure.

By using Equation (1), received signal vectors $r_{2k}$ and $r_{2k+1}$ over two consecutive REs 2k and 2k+1 may be rearranged as Equation (14) below:

$$r_{2k,2k+1} = \begin{bmatrix} r_{2k} \\ r^*_{2k+1} \end{bmatrix} = z^S_{2k,2k+1} + z^I_{2k,2k+1} + \begin{bmatrix} n_{2k} \\ n^*_{2k+1} \end{bmatrix}, \tag{14}$$

where $r^*_{2k+1}$ denotes a conjugate value of $r_{2k+1}$, and $z_{2k,2k+1}^S$ and $z_{2k,2k+1}^I$ denote signal vectors received in a serving cell and an interfering cell, respectively.

Then, $z_{2k,2k+1}^S$ may be expressed for TM2, TM4, and TM6 as Equations (15), (16), and (17), respectively:

$$z_{2k,2k+1}^{S,TM2} = H_{2k,2k+1}^{S,TM2} \begin{bmatrix} x^{S,0} \\ (x^{S,1})^* \end{bmatrix} = \begin{bmatrix} h_{2k}^{S,0} & -h_{2k}^{S,1} \\ (h_{2k+1}^{S,1})^* & (h_{2k+1}^{S,0})^* \end{bmatrix} \begin{bmatrix} x^{S,0} \\ (x^{S,1})^* \end{bmatrix}, \tag{15}$$

$$z_{2k,2k+1}^{S,TM4} = \tag{16}$$

$$H_{2k,2k+1}^{S,TM4} \begin{bmatrix} x_{2k}^{S,0} \\ x_{2k}^{S,1} \\ (x_{2k+1}^{S,0})^* \\ (x_{2k+1}^{S,1})^* \end{bmatrix} = \begin{bmatrix} h_{2k}^{S,0} & h_{2k}^{S,1} & 0 & 0 \\ 0 & 0 & (h_{2k+1}^{S,0})^* & (h_{2k+1}^{S,1})^* \end{bmatrix} \begin{bmatrix} x_{2k}^{S,0} \\ x_{2k}^{S,1} \\ (x_{2k+1}^{S,0})^* \\ (x_{2k+1}^{S,1})^* \end{bmatrix},$$

$$z_{2k,2k+1}^{S,TM6} = H_{2k,2k+1}^{S,TM6} \begin{bmatrix} x_{2k}^{S,0} \\ (x_{2k+1}^{S,0})^* \end{bmatrix} = \begin{bmatrix} h_{2k}^{S,0} & 0 \\ 0 & (h_{2k+1}^{S,0})^* \end{bmatrix} \begin{bmatrix} x_{2k}^{S,0} \\ (x_{2k+1}^{S,0})^* \end{bmatrix} \tag{17}$$

Equation (15) expresses a serving signal vector for TM2 (2k and 2k+1 are not distinguished because the same transmission symbol is transmitted in two REs in a transmit diversity scheme, and two transmission layers 0 and 1 are used). Equation (16) expresses a serving signal vector for TM4 (two transmission layers 0 and 1 are used and independent symbols are transmitted in two REs 2k and 2k+1). Equation (17) expresses a serving signal vector for TM6 (one transmission layer 0 is used and independent symbols are transmitted in two REs 2k and 2k+1). Herein, $h_k^{S,i}$ denotes a channel vector of an $i^{th}$ symbol layer in an RE k from a serving cell (i.e., an $i^{th}$ column of $H_k^S$).

Similarly, the interference signal vector $z_{2k,2k+1}^I$ for TM2, TM4, and TM6 transmission may be expressed as Equations (18), (19), and (20), respectively:

$$z_{2k,2k+1}^{I,TM2} = \begin{bmatrix} h_{2k}^{I,0} & -h_{2k}^{I,1} \\ (h_{2k+1}^{I,1}) & (h_{2k+1}^{I,0})^* \end{bmatrix} \begin{bmatrix} x^{I,0} \\ (x^{I,1})^* \end{bmatrix} \tag{18}$$

$$z_{2k,2k+1}^{I,TM4} = \begin{bmatrix} h_{2k}^{I,0} & h_{2k}^{I,1} & 0 & 0 \\ 0 & 0 & (h_{2k+1}^{I,0})^* & (h_{2k+1}^{I,1})^* \end{bmatrix} \begin{bmatrix} x_{2k}^{I,0} \\ x_{2k}^{I,1} \\ (x_{2k+1}^{I,0})^* \\ (x_{2k+1}^{I,1})^* \end{bmatrix}, \tag{19}$$

$$z_{2k,2k+1}^{I,TM6} = \begin{bmatrix} h_{2k}^{I,0} & 0 \\ 0 & (h_{2k+1}^{I,0})^* \end{bmatrix} \begin{bmatrix} x_{2k}^{I,0} \\ (x_{2k+1}^{I,0})^* \end{bmatrix} \tag{20}$$

Equation (18) expresses an interference signal vector for TM2. Equation (19) expresses an interference signal vector for TM4. Equation (20) expresses an interference signal vector for TM6. Herein, $h_k^{I,i}$ denotes an $i^{th}$ column of $H_k^I$.

Corresponding TM2, TM4, and TM4 effective channel matrices $H_{2k,2k+1}^{I,TM2}$, $H_{2k,2k+1}^{I,TM4}$, and $H_{2k,2k+1}^{I,TM6}$ are given by Equations (21), (22), and (23), respectively:

$$H_{2k,2k+1}^{I,TM2} = \begin{bmatrix} h_{2k}^{I,0} & -h_{2k}^{I,1} \\ (h_{2k+1}^{I,1}) & (h_{2k+1}^{I,0})^* \end{bmatrix} \quad (21)$$

$$H_{2k,2k+1}^{I,TM4} = \begin{bmatrix} h_{2k}^{I,0} & h_{2k}^{I,1} & 0 & 0 \\ 0 & 0 & (h_{2k+1}^{I,0})^* & (h_{2k+1}^{I,1})^* \end{bmatrix} \quad (22)$$

$$H_{2k,2k+1}^{I,TM6} = \begin{bmatrix} h_{2k}^{I,0} & 0 \\ 0 & (h_{2k+1}^{I,0})^* \end{bmatrix} \quad (23)$$

A comparison between Equation (21) and Equation (22) indicates that the received signal vector $H_{2k,2k+1}^{I,TM2}$ spans the same two-dimensional space generated by the columns of $H_{2k,2k+1}^{I,TM2}$ with a size of 4×2, and the received signal vector $H_{2k,2k+1}^{I,TM4}$ spans the same four-dimensional space generated by the columns of $z_{2k,2k+1}^{I,TM4}$ with a size of 4×4. Thus, the communication device blindly detects an interference TM between TM2 and TM4 by using such a feature.

As described above, embodiments of the present disclosure describe projection-based detection using a channel-independent set of Grassmannian vectors, which can be applied regardless of channel realizations, as the projection vector pm. Alternatively, the present disclosure may make use of a channel-dependent set (e.g., a set of two vectors which span the null space of instantaneous channel realization $H_{2k,2k+1}^{I,TM2}$) as the projection vector.

Table 4 includes a set of unit-norm Grassmannian vectors for M=8 and a vector size 2*$N_r$=4 for TPR detection using two REs, according to an embodiment of the present disclosure.

TABLE 4

| M | Set of Grassmannian Vectors | | |
|---|---|---|---|
| 8 | $\begin{bmatrix} -0.3314 - 0.0047i \\ -0.4009 - 0.2522i \\ -0.0203 - 0.2096i \\ -0.4851 - 0.6214i \end{bmatrix}$ | $\begin{bmatrix} -0.7751 + 0.3033i \\ 0.2945 - 0.1156i \\ 0.0965 - 0.3193i \\ 0.2212 - 0.2167i \end{bmatrix}$ | |
| | $\begin{bmatrix} 0.0919 - 0.43467i \\ 0.0314 - 0.4463i \\ -0.4258 + 0.6044i \\ 0.2206 + 0.0850i \end{bmatrix}$ | $\begin{bmatrix} -0.1046 - 0.4547i \\ -0.8317 + 0.1519i \\ -0.2089 - 0.1518i \\ 0.0277 - 0.0066i \end{bmatrix}$ | |
| | $\begin{bmatrix} 0.0601 - 0.1164i \\ 0.3748 + 0.1606i \\ 0.6580 - 0.0658i \\ -0.4326 + 0.4384i \end{bmatrix}$ | $\begin{bmatrix} 0.5292 + 0.2116i \\ 0.0919 + 0.6399i \\ -0.2403 + 0.0270i \\ 0.3590 - 0.2644i \end{bmatrix}$ | |
| | $\begin{bmatrix} 0.2213 - 0.3146i \\ -0.2088 + 0.3146i \\ 0.3270 - 0.5879i \\ 0.4980 - 0.0941i \end{bmatrix}$ | $\begin{bmatrix} -0.3678 - 0.4684i \\ 0.0561 + 0.0680i \\ -0.4548 - 0.2627i \\ -0.2863 + 0.5289i \end{bmatrix}$ | |

By applying a projection vector pm 300 with a size of 4×1 as shown in Table 4 to two adjacent (consecutive) subcarriers (i.e., REs), a projection output, as expressed by Equation (24) may be obtained.

$$p_{m,k} = (p_m)^\dagger r_{2k,2k+1} = (p_m^{1:2})^\dagger r_{2k} + (p_m^{3:4})^\dagger r^*_{2k+1} \quad (24)$$

where $p_m^{1:2}$ and $p_m^{3:4}$ denote an upper sub-vector and a lower sub-vector of the projection vector $p_m$, respectively. The upper sub-vector and the lower sub-vector may be expressed as shown in Equation (25) below:

$$p_m = \begin{bmatrix} p_m^{1:2} \\ p_m^{3:4} \end{bmatrix} \quad (25)$$

Then, corresponding squared expected values are provided as variances of interference TM2 and TM4 as set forth in Equations (26) and (27), respectively:

$$VAR[p_{m,k}] = \sigma_S^2 \|(p_m)^\dagger H_{2k,2k+1}^{S,TM}\|_f^2 + \hat{\rho}_I \sigma_I \|(p_m)^\dagger H_{2k,2k+1}^{S,TM2}\|_f^2 + \sigma_n^2 \|p_m\|_f^2 \quad (26)$$

$$VAR[p_{m,k}] = \sigma_S^2 \|(p_m)^\dagger H_{2k,2k+1}^{S,TM}\|_f^2 + \hat{\rho}_I \sigma_I \|(p_m)^\dagger H_{2k,2k+1}^{S,TM4}\|_f^2 + \sigma_n^2 \|p_m\|_f^2 \quad (27)$$

where $\hat{\rho}_I$ denotes a TPR detected using Equation (13).

Equation (26) expresses the variance of TM2, and Equation (27) expresses the variance of TM4.

Note that Equation (26) and Equation (27) provide different values with respect to an interference TM, as expressed by Equations (28) and (29), respectively:

$$\|(p_m)^\dagger H_{2k,2k+1}^{I,TM2}\|_f^2 = \|(p_m^{1:2})^\dagger h_{2k}^{I,0} + (p_m^{3:4})^\dagger (h_{2k+1}^{I,1})^*\|_f^2 + \|-(p_m^{1:2})^\dagger h_{2k}^{I,1} + (p_m^{3:4})^\dagger (h_{2k+1}^{I,0})^*\|_f^2 \quad (28)$$

$$\|(p_m)^\dagger H_{2k,2k+1}^{I,TM4}\|_f^2 = \|(p_m^{1:2})^\dagger h_{2k}^{I,0}\|_f^2 + \|(p_m^{1:2})^\dagger h_{2k}^{I,1}\|_f^2 + \|(p_m^{3:4})^\dagger (h_{2k+1}^{I,0})^*\|_f^2 + \|-(p_m^{3:4})^\dagger (h_{2k+1}^{I,1})^*\|_f^2 \quad (29)$$

Thus, as applied in the above-described TPR detection, for each of interference TM2 and TM4, a sum of squares $\chi_m$ for random variables may be obtained as set forth in Equation (30) below:

$$\chi_m = \sum_{k=1}^{K} \frac{|p_{m,k}|^2}{VAR[p_{m,k}]} \quad (30)$$

The present disclosure may define a TM decision metric $\mathcal{M}(\hat{\rho}_I, TM)$ that is equivalent to the metric defined in Equation (11), as set forth in Equation (31) below:

$$M(\hat{\rho}_I, TM) = \sum_{m=1}^{M} (\chi_m - K)^2 \quad (31)$$

Equation (31) may be simplified as Equation (32) below:

$$M(\hat{\rho}_I, TM) \cong \sum_{m=1}^{M} \left( \frac{\sum_{k=1}^{K} |p_{m,k}|^2 - \sum_{k=1}^{K} VAR[p_{m,k}]}{\sum_{k=1}^{K} VAR[p_{m,k}]} \right)^2, \quad (32)$$

where an actual squared value of the projection output $P_{m,k}$ for the received signal is expressed as $|p_{m,k}|^2$, and an expected squared value of the projection output $P_{m,k}$ for the received signal is expressed as a variance $VAR[p_{m,k}]$. The metric may be determined by using M pairs of the actual squared value and the expected squared value. That is, the communication device, according to an embodiment of the present disclosure, may determine the metric by using the actual squared value and the expected squared value of the projection output $P_{m,k}$.

Finally, embodiments of the present disclosure may determine an interference TM $\widehat{TM}$ satisfying the following Equation (33) below:

$$\widehat{TM} = \arg\min_{TM \in (2,4)} \mathcal{M}(\hat{\rho}_I, TM) \quad (33)$$

Figure 4:
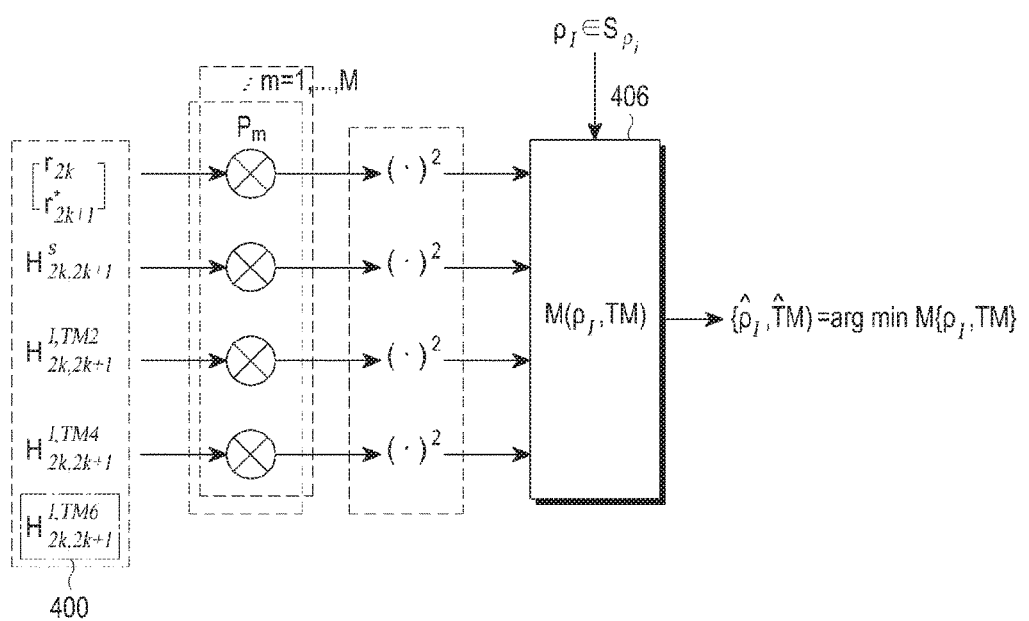
FIG. 4 is a block diagram illustrating determination of a TPR, a TF, and a TM of a projection-based interference signal using two consecutive REs, according to an embodiment of the present disclosure.

FIG. 4 is a block diagram illustrating a determination of a TPR, a TF, and a TM of a projection-based interference signal using two consecutive REs, according to an embodiment the present disclosure.

In FIGS. 2 and 3, the communication device determines a TPR and a TF by using one RE, and determines a TM by using two REs based on the determined TF. However, the communication device detects a TM by using a signal received from two REs.

In FIG. 4, the communication device detects whether the interference TM is TM2 or TM4, and blindly detects whether the interference TM is TM6 by using an effective channel matrix $H_{2k,2k+1}^{I,TM6}$ 400 for TM6.

A squared expected value corresponding to TM6 may be given as a variance of TM6 through Equation (34) below:

$$VAR[p_{m,k}] = \sigma_S^2 \|(p_m)^\dagger H_{2k,2k+1}^{S,TM}\|_f^2 + \hat{\rho}_I \sigma_I^2 \|(p_m)^\dagger H_{2k,2k+1}^{S,TM6}\|_f^2 + \sigma_n^2 \|(p_m)\|_f^2 \quad (34)$$

A value of Equation (32) may be determined using Equation (35) below:

$$\|(p_m)^\dagger H_{2k,2k+1}^{S,TM2}\|_f^2 = \|(p_m^{1:2})^\dagger h_{k2}^{I,0}\|_f^2 + \|(p_m^{3:4})^\dagger (h_{k2}^{I,0})^*\|_f^2 \quad (35)$$

The communication device may determine the interference TM $\widehat{TM}$ and TPR that satisfy the following equation by using the TM decision metric determined by Equation (31) or (32).

$$\{\hat{\rho}_I, \widehat{TM}\} = \arg\min_{\rho_I \in S_{\rho_I}, TM \in \{2,4,6\}} M(\rho_I, TM) \quad (36)$$

That is, by using Equation (36), the communication device determines a TPR of an interference signal and presence of a PDSCH. If the PDSCH exists, the communication device detects a TM from among TM2, TM4, and TM6.

Figure 5:
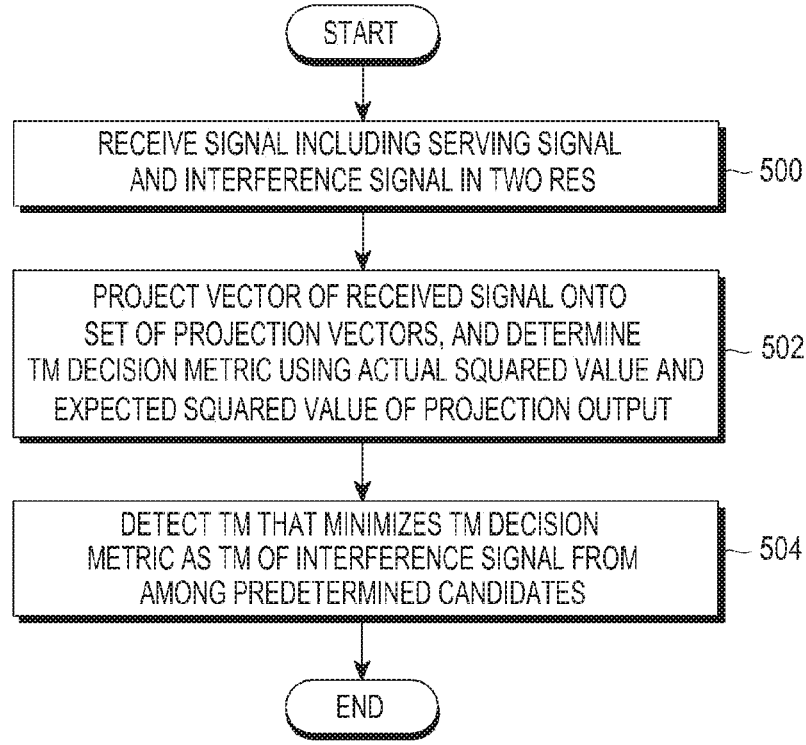
FIG. 5 is a flowchart illustrating a method for determining an interference TM by a communication device, according to an embodiment of the present disclosure.

FIG. 5 is a flowchart illustrating a method for determining an interference TM by a communication device, according to an embodiment of the present disclosure.

The communication device performs communication by using a communication resource defined by frequency and time, that is, an RE. The communication device receives a signal including a serving signal and an interference signal in two REs corresponding to consecutive subcarriers, in step 500.

The communication device projects a vector of the received signal onto a set of M(=2, 4, 8) projection vectors to generate a random variable $p_m$, and determines a TM decision metric by using the random variable, in step 502. For example, the projection vector may be a Grassmannian vector.

The communication device detects a TM minimizing the TM decision metric as a TM of the interference signal from among predetermined TM candidates, in step 504.

Herein, the predetermined TM candidates may include TM2 (a transmit diversity scheme) and TM4 (Rank-2 closed loop MIMO) of an LTE system. The TM candidates may further include TM6 with an RI=1 (or TM4 with an RI=1).

Selectively, the communication device may further perform the above-described operations for TF and TPR blind detection, prior to generation of the random variable and determination of the TM decision metric. For example, the communication device may determine whether the interference TM is TM2 or TM4, in step 504, if the determined TF is $tf_4$.

Figure 6:
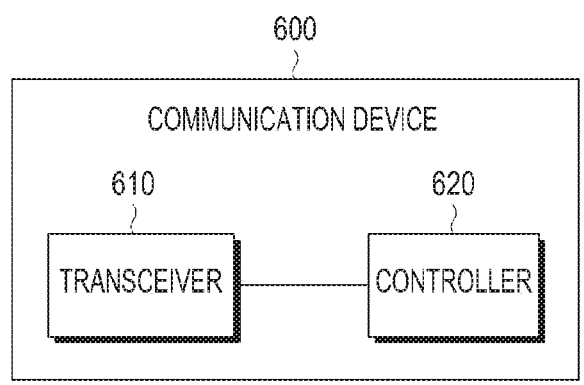
FIG. 6 is a diagram illustrating a structure of a communication device, according to an embodiment of the present disclosure.

FIG. 6 is a diagram illustrating a structure of a communication device, according to an embodiment of the present disclosure.

A communication device 600 includes a transceiver 610 for performing signal transmission/reception with another communication device or an entity in a network. The communication device 600 also includes a controller 620 for controlling every operation of the communication device 600. All operations of the communication device or the user equipment described in an embodiment of the present disclosure may be understood as being performed under the control of the controller 620. However, the controller 620 and the transceiver 610 are not necessarily implemented by separate devices, and may be implemented as one component in the form of a single chip (e.g., a modem chip).

It should be noted that flowcharts, block diagrams, and device configuration diagrams, as illustrated in FIGS. 1 through 6, are not intended to limit the scope of the present disclosure. That is, all components and operations illustrated in FIGS. 1 through 6 should not be interpreted as essential elements for carrying out embodiments of the present disclosure, and may be implemented within a scope without spoiling the gist of the present disclosure by merely including some elements.

The above-described operations may be implemented by including a memory device, which stores a corresponding program code in an arbitrary component, in the communication device. That is, the controller of the communication device may perform the above-described operations by reading and executing the program code stored in the memory device through a processor or a central processing unit (CPU).

The computer system may be implemented in accordance with a processor, a memory, input/output (I/O) devices, and a network interface, coupled via a computer bus or alternate connection arrangement.

It is to be appreciated that the term "processor", as used herein, is intended to include any processing device, such as, for example, one that includes a central processing unit (CPU) and/or other processing circuitry. It is also to be understood that the term "processor" may refer to more than one processing device and that various elements associated with a processing device may be shared by other processing devices. The term "memory" as used herein is intended to include memory associated with a processor or CPU, such as, for example, random access memory (RAM), read only memory (ROM), a fixed memory device (e.g., hard drive), a removable memory device, flash memory, etc.

In addition, the phrase "I/O devices", as used herein, is intended to include, for example, one or more input devices for entering information into the processing unit, and/or one or more output devices for outputting information associated with the processing unit.

Still further, the phrase "network interface", as used herein, is intended to include, for example, one or more transceivers to permit the computer system to communicate with another computer system via an appropriate communications protocol. This may provide access to computer systems that provide information regarding timing reports of signal paths or physical layouts of integrated circuit devices.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

An entity, various components of the communication device, and modules described herein may operate using a hardware circuit, for example, a complementary metal oxide semiconductor (CMOS)-based logic circuit, and a hardware circuit such as firmware, software and/or hardware, and a combination of firmware and/or software inserted into a machine readable medium. For example, various electric structures and methods may be realized using electric circuits such as, for example, transistors, logic gates, and on-demand semiconductors.

As is apparent from the foregoing description, TPR estimation, according to embodiments of the present disclosure, guarantees a high detection success rate with a low computational complexity, and provides BLER performance that is similar to a case in which an actual TPR is signaled to the communication device.

Advanced NAICS receivers based on blind detection, according to embodiments of the present disclosure, may be possible candidates for additional high performance and low complexity UE devices.

According to embodiments of the present disclosure, the communication device may determine a TF of an interference signal with low complexity, and may determine an interference TM through the determined TF.

The present invention may be utilized in conjunction with the manufacture of integrated circuits, chip sets, or system-on-chips (SoCs). Integrated circuits so manufactured are considered part of this invention.

While the present disclosure has been shown and described with reference to certain embodiments thereof, it will be understood that various modifications or changes in form and detail may be made therein without departing from the spirit and scope of the disclosure as defined by the appended claims.

What is claimed is:

1. A method for determining an interference transmission mode (TM) at a communication device in a cellular communication system using a resource element (RE) defined by frequency and time, the method comprising:
   receiving a first signal in one RE, the first signal comprising a serving signal and an interference signal;
   projecting a first vector of the received first signal onto each of N projection vectors;
   determining a traffic-to-pilot ratio (TPR) decision metric of the interference signal using N pairs of an actual squared value and an expected squared value which are corresponding to the projected first vector; and
   determining, from among predetermined transmit format (TF) candidates, a TF of the interference signal which minimizes the TPR decision metric; and
   obtaining a TM of the interference signal from among predetermined TM candidates, based on the determined TF of the interference signal;
   wherein the predetermined TM candidates comprise a first TM using a transmit diversity scheme and a second TM with a rank indicator (RI)=2 using a multiple input multiple output (MIMO) scheme.

2. The method of claim 1, wherein the predetermined TF candidates comprise: a first TF comprising TM6 of a long term evolution (LTE) system with a precoding matrix indicator (PMI)=0, a second TF comprising TM6 with a PMI=1, a third TF comprising TM6 with a PMI=2, a fourth TF comprising TM6 with a PMI=3, and a fifth TF comprising TM2, TM3, and TM4.

3. The method of claim 1, further comprising:
   determining a TPR corresponding to the obtained TM of the interference signal.

4. The method of claim 1, wherein the N projection vectors are Grassmannian vectors, and a value of N is one of 2, 4, and 8.

5. A method for determining an interference transmission mode (TM) at a communication device in a cellular communication system using a resource element (RE) defined by frequency and time, the method comprising:
   receiving a first signal in two REs corresponding to consecutive subcarriers, the first signal comprising a serving signal and an interference signal;
   projecting a first vector of the first signal onto each of M projection vectors;
   determining a traffic-to-pilot ratio (TPR) decision metric using M pairs of an actual squared value and an expected squared value which are corresponding to the projected first vector; and
   detecting, from among predetermined TM candidates, a TM of the interference signal which minimizes the TPR decision metric,
   wherein the predetermined TM candidates comprise a first TM using a transmit diversity scheme and a second TM with a rank indicator (RI)=2 using a multiple input multiple output (MIMO) scheme.

6. The method of claim 5, wherein the first TM is TM2 of a long term evolution (LTE) system, and the second TM is TM3 or TM4 of the LTE system.

7. The method of claim 5, further comprising:
   determining a TPR corresponding to the detected TM of the interference signal.

8. The method of claim 5, wherein the M projection vectors are Grassmannian vectors, and a value of M is one of 2, 4, and 8.

9. A communication device in a cellular communication system using a resource element (RE) defined by frequency and time, the communication device comprising:
   a transceiver configured to receive a first signal in one RE, the first signal comprising a serving signal and an interference signal; and
   a controller configured to:
      project a first vector of the received first signal onto each of N projection vectors,
      determine a traffic-to-pilot ratio (TPR) decision metric of the interference signal using N pairs of an actual squared value and an expected squared value which are corresponding to the projected first vector,
      determine, from among predetermined transmit format (TF) candidates, a TF of the interference signal which minimizes the TPR decision metric, and
      obtain a TM of the interference signal from among predetermined TM candidates, based on the determined TF of the interference signal,
   wherein the predetermined TM candidates comprise a first TM using a transmit diversity scheme and a second TM with a rank indicator (RI)=2 using a multiple input multiple output (MIMO) scheme.

10. The communication device of claim 9, wherein the predetermined TF candidates comprise: a first TF comprising TM6 of a long term evolution (LTE) system with a precoding matrix indicator (PMI)=0, a second TF comprising TM6 with a PMI=1, a third TF comprising TM6 with a PMI=2, a fourth TF comprising TM6 with a PMI=3, and a fifth TF comprising TM2, TM3, and TM4.

11. The communication device of claim 9, wherein the controller is further configured to determine a TPR corresponding to the obtained TM of the interference signal.

12. The communication device of claim 9, wherein the N projection vectors are Grassmannian vectors, and a value of N is one of 2, 4, and 8.

13. The communication device of claim 9, wherein the controller is further configured to cancel the interference signal from the first signal using the obtained TM of the interference signal.

14. A communication device in a cellular communication system using a resource element (RE) defined by frequency and time, the communication device comprising:
   a transceiver configured to receive a first signal in two REs corresponding to consecutive subcarriers, the first signal comprising a serving signal and an interference signal; and
   a controller configured to:
      project a first vector of the first signal onto each of M projection vectors,
      determine a traffic-to-pilot ratio (TPR) decision metric using M pairs of an actual squared value and an expected squared value which are corresponding to the projected first vector, and
      determine, from among predetermined TM candidates, a TM of the interference signal which minimizes the TPR decision metric,
   wherein the predetermined TM candidates comprise a first TM using a transmit diversity scheme and a second TM with a rank indicator (RI)=2 using a multiple input multiple output (MIMO) scheme.

15. The communication device of claim 14, wherein the controller is further configured to determine a TPR corresponding to the determined TM of the interference signal.

16. The communication device of claim 14, wherein the M projection vectors are Grassmannian vectors, and a value of M is one of 2, 4, and 8.

* * * * *